(12) United States Patent
Houldsworth (10) Patent No.: US 6,314,436 B1
(45) Date of Patent: Nov. 6, 2001

(54) SPACE-LIMITED MARKING STRUCTURE FOR TRACING GARBAGE COLLECTORS

(75) Inventor: Richard J. Houldsworth, Horley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/170,469

(22) Filed: Oct. 13, 1998

(30) Foreign Application Priority Data

Oct. 14, 1997 (GB) ................................................. 9721659

(51) Int. Cl.⁷ ............................ G06F 17/30; G06F 12/00
(52) U.S. Cl. ........................................................... 707/206
(58) Field of Search .............................. 707/206; 709/104

(56) References Cited

U.S. PATENT DOCUMENTS

| | | | |
|---|---|---|---|
| 4,797,810 | * 1/1989 | McEntee et al. | 707/206 |
| 5,088,036 | * 2/1992 | Ellis et al. | 707/206 |
| 5,241,673 | * 8/1993 | Schelvis | 707/206 |
| 5,485,613 | * 1/1996 | Engelstad et al. | 707/206 |
| 5,652,883 | * 7/1997 | Adcock | 707/206 |
| 5,920,876 | * 7/1999 | Ungar et al. | 707/206 |
| 6,098,089 | * 8/2000 | O'Connor et al. | 709/104 |

OTHER PUBLICATIONS

"Mostly Parallel Garbage Collection" Hans J. Boehm et al, Proceedings of ACM Sigplan '91 Conference on Programming Language Design and Implementation p. 157–164.

"Garbage Collection: Algorithms for Automatic Dynamic Memory Management", by R. Jones et al, John Wiley & Sons 1996, pp. 1–18.

Uniprocessor Garbage Collection Techniques, by P.R. Wilson, Proc. of the 1992 Intl. Workshop on Memory Management, St. Malo, France, Sep. 1992.

* cited by examiner

Primary Examiner—Sanjiv Shah
(74) Attorney, Agent, or Firm—Peter Verdonk (57) ABSTRACT

A data processing method and apparatus are described for tracing paths through stored data structures defined by data objects coupled by identifying pointers and within a contiguous area of memory. A fixed sized marking stack or queue builds up a list of located objects as the structure or structures are traversed. The contiguous memory is divided into discrete pages with the linked data objects within each being considered in turn: any link to an object in another page causes an identifier for that page to be entered in a page list if one does not already exist, and a page table for each page identifies the location of the first and last identified objects within a page to set a range for subsequent scanning.

7 Claims, 6 Drawing Sheets

SPACE-LIMITED MARKING STRUCTURE FOR TRACING GARBAGE COLLECTORS

FIELD OF THE INVENTION

The present invention relates to a method and apparatus for handling interconnected stored data objects and particularly, but not exclusively, to tracing references through object structures in memory compaction and garbage collection procedures executing in real time in real or virtual memory space of a data processing apparatus.

BACKGROUND ART

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18, and "Uniprocessor Garbage Collection Techniques" by P. R. Wilson, Proceedings of the 1992 International Workshop on Memory Management, St. Malo, France, September 1992. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

A common feature of a number of garbage collection reclamation techniques, as described in the above-mentioned Wilson reference, is incrementally traversing the data structure formed by referencing pointers carried by separately stored data objects. The technique involves first marking all stored objects that are still reachable by other stored objects or from external locations by tracing a path or paths through the pointers linking data objects. This may be followed by sweeping or compacting the memory—that is to say examining every object stored in the memory to determine the unmarked objects whose space may then be reclaimed.

In many cases, garbage collection is a system-wide task which operates on a single global heap, that is to say a single memory area where data structures or objects are stored in no specific order—only with regard to whether a particular space is large enough to hold a particular object. All tracing garbage collection systems include a mechanism for traversing the data structure within the heap. A mark stack or queue is used to store references to the objects pending traversal. However, in the worst case situation, the size of the marking data structure can be comparable with the size of the heap. As the purpose of the garbage collector is to reclaim memory, it is unacceptable for the marking process to require more memory than a small static amount. The Wilson reference identifies a number of conventional solutions, including dedicating a field in each allocated object for a pointer to the next in the marking list. This guarantees a static overhead by allowing for the worst-case situation, where all objects are on the marking list, and is therefore wasteful in memory. Another technique allocates a fixed-size marking structure, and uses the marking structure until is becomes full, following which the marking list is processed without placing new items back on it. Memory then needs to be scanned to find the overflow items. This compromise solution has a poor worst-case performance because large areas of memory may need to be repeatedly scanned for overflowed data. A third technique uses pointer reversal to store pointers back up the marking tree from the current node. Although no extra space is required, because the heap objects are in a non-usable state whilst the algorithm is running, this algorithm cannot be used incrementally. Of the three techniques, the second is preferred as it is not as wasteful of memory as the first and, unlike the third, it does not require the program execution to halt for extended periods which the complete garbage collection procedure is implemented.

SUMMARY OF THE INVENTION

It is therefore an object of the present invention to provide improved efficiency in a tracing/marking technique suitable for use as part of an incremental garbage collection procedure, and in data processing apparatuses employing the same, where a fixed and finite-sized marking structure is used.

In accordance with the present invention there is provided a marking method for traversing data structures formed of data objects linked by identifying pointers in a contiguous memory, preparatory to garbage collection of unmarked data objects, the method comprising the steps of:

a) for a selected root object, traversing the pointers carried thereby to determine the objects linked to the root object;

b) entering references to each object newly determined by the preceding step to a fixed size marking structure; and c) traversing pointers to determine further objects linked to those identified by the previous step;

wherein steps b) and c) are repeated until the marking structure is full, following which the objects identified therein are marked, then the memory is scanned to locate any further objects linked to those already marked, characterised in that the contiguous memory is divided into a plurality of discrete pages, steps b) and c) are restricted to those objects within the same page as the root object, and for any linked objects outside of that page, an identifier for that page is instead stored at step b).

By limiting the area initially processed to a page, and then logging the pages where "overflow" objects occur, the efficiency is improved and the amount of subsequent scanning is reduced. The marking structure is preferably of a size to accommodate respective references for the largest number of objects capable of being contained in a page, such that the marking structure may be considered full when all objects within a page have been considered. In operation, the above-recited steps a), b), and c) are suitably performed for each page in sequence, with the subsequent iterations of steps b) and c) being repeated in a cycle through the pages until no unmarked linked objects remain within the contiguous memory: at this point, any remaining unmarked objects may be assumed to be unreachable, and hence garbage which may be deleted.

Also in accordance with the present invention there is provided a data processing apparatus comprising a data processor coupled with a random access memory containing a plurality of data objects linked in data structures by identifying pointers and within a contiguous area of the memory, the apparatus further comprising first additional storage means containing a fixed sized marking data structure, and the processor being configured to effect the following operations on the stored plurality of data objects:

a) for a selected root object, traversing the pointers carried thereby to determine the objects linked to the root object;

b) entering references to each object newly determined by the preceding step in the structure of the first additional storage means; and c) traversing pointers to determine further objects linked to those identified in the first additional storage means;

wherein the processor repeats operations b) and c) until the marking structure is full, marks the objects identified therein, and scans the contiguous area of random access memory to locate any further objects linked to those already marked; characterised in that the contiguous memory is divided into a plurality of discrete pages, operations b) and c) are restricted to those objects within the same page as the root object, for any linked objects outside of that page, an identifier for that page is stored in a second additional storage means, and the scanning to locate any further objects linked to those already marked is performed only for those pages identified in the second additional storage means. The first and second additional storage means may be provided as separate discrete devices, or they may comprises stacks or queues held within the same random access memory, although separate from the contiguous scanned section.

A third additional storage means may be provided containing, for each page, an indication of the extent of coverage of that page by located data objects, with the scanning to locate any further objects linked to those already marked being performed only for those covered areas within the respective pages identified in the second additional storage means. Where the contents of each page are linearly addressed, these third additional storage means may suitably hold a pair of pointers to the start of respectively the first and the last located data objects, with the scanning just being carried out in the area between the two addresses. In such an arrangement, the processor is preferably configured, on identifying an object in a page other than that being processed, to compare the start location for the newly-located object with the respective start and end pointers for that page and update them as appropriate.

BRIEF DESCRIPTION OF THE DRAWINGS

The invention will now be described by way of example only, with reference to the accompanying drawings, in which.

DETAILED EMBODIMENTS

Figure 1:
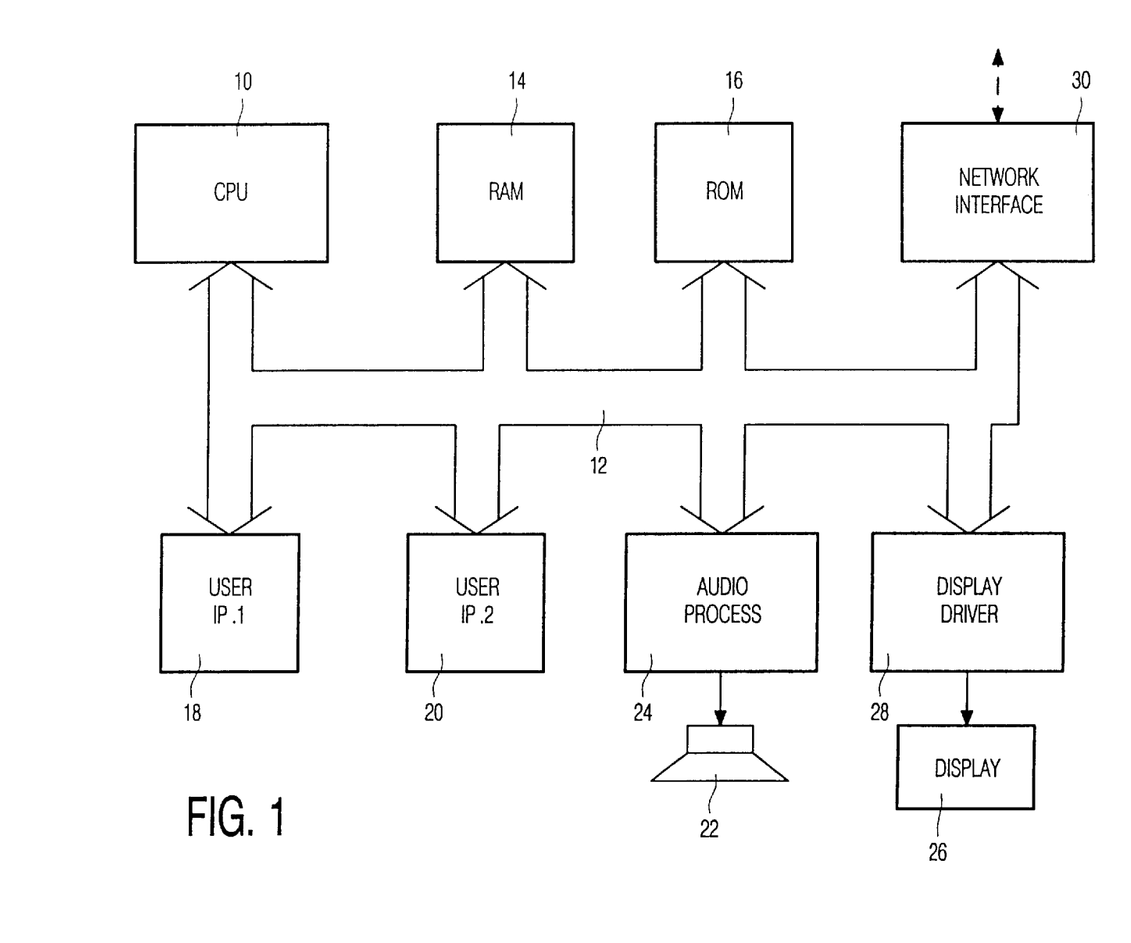
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14,16. These memories may be comprised of one or several integrated circuit devices and may be augmented by a system hard-disk as well as means to read from additional (removable) memory devices, such as a CD-ROM. The present invention is particularly embodied in memory management for a working area of the RAM 14 under control of the CPU 10; a controlling program for this may initially be held in ROM 16 and loaded up with the operating system on power-up.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via online link to remote sites, for example via the Internet, to which end the system is provided with a network interface 30 coupled to the bus 12.

Figure 2:
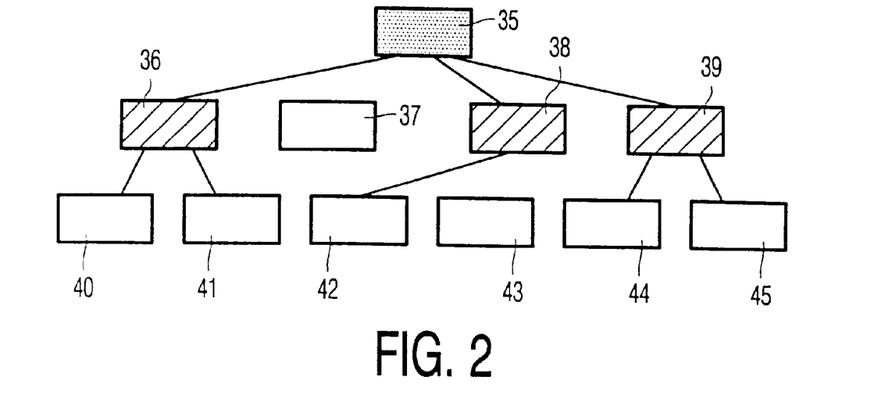
FIGS. 2 to 4 represent a group of partially linked data objects as tracing proceeds, using a tricolour marking scheme.
Figure 3:
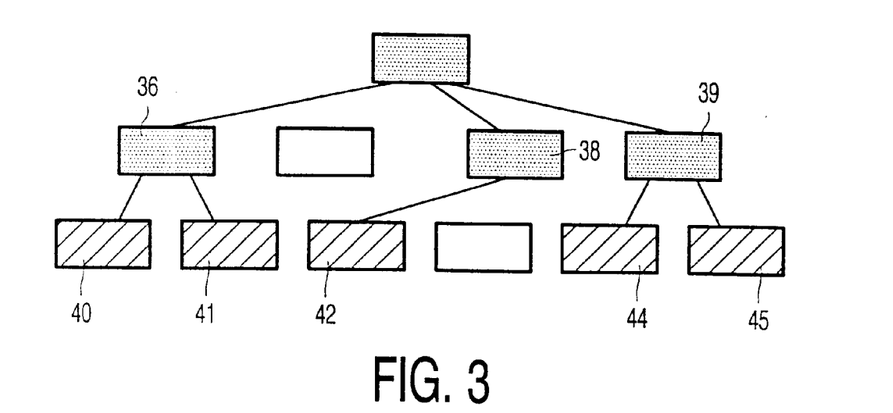
Figure 4:
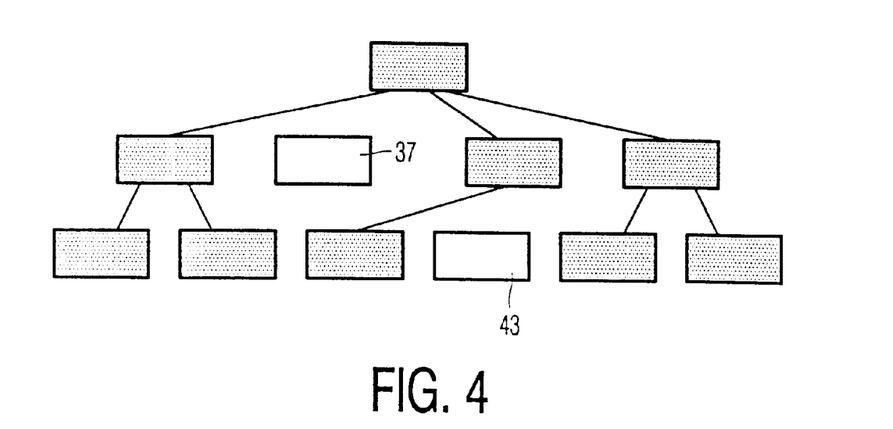

FIGS. 2 to 4 schematically illustrate the basic principles of tracing in incremental garbage collecting using a tricolour marking scheme, the terminology of which will be used in the following examples. A particular feature of incremental collectors is that the procedure is not carried out contiguously but in discrete steps interspersed with periods of program execution to avoid introducing lengthy breaks to the execution. The tricolour scheme is a convenient method to describe the process of marking as it spreads through the "network" formed by memory objects linked by pointers. In the scheme, objects which have been reached and passed by the traversal process (i.e the traversal has reached all linked descendants) are coloured black; those objects reached by the traversal whose actual or potential descendants have not been reached are coloured grey, and all other objects are coloured white.

In the partially-linked collection of objects of FIGS. 2 to 4, FIG. 2 shows the status after the first incremental stage of the tracing procedure starting from object 35 and spreading outwards/downwards, with object 35 marked black and the three objects 36,38,39 to which it carries pointers being marked grey. FIG. 3 represents the status after a further incremental stage with the descendant objects 40,41,42,44, 45 of objects 36,38,39 having been reached by the traversal and accordingly marked grey. As all their descendants have been reached, objects 36,38,39 are marked black at this stage. FIG. 4 represents the final stage at which it has been determined that there are no remaining linked objects, and objects 40,41,42,44,45 are marked black. This concludes the mark phase and shows that there are two "unreachable" objects 37,43 to which there are no pointers. These objects are still marked white, indicating them to be garbage and thus available for deletion.

The tricolour marking scheme is discussed in greater detail in the previously cited Wilson reference including various techniques for handling the incremental nature of the procedure, where the layout of the data structure may change during traversal, with the interspersed segments of program execution shifting the arrangement of placed pointers. One particular point to note is that the hierarchical layout of objects in FIGS. 2 to 4 is purely for the purposes of illustration: in actuality, the objects may be spread throughout the available memory with the hierarchy only determined by the arrangement of linking pointers.

Figure 5:
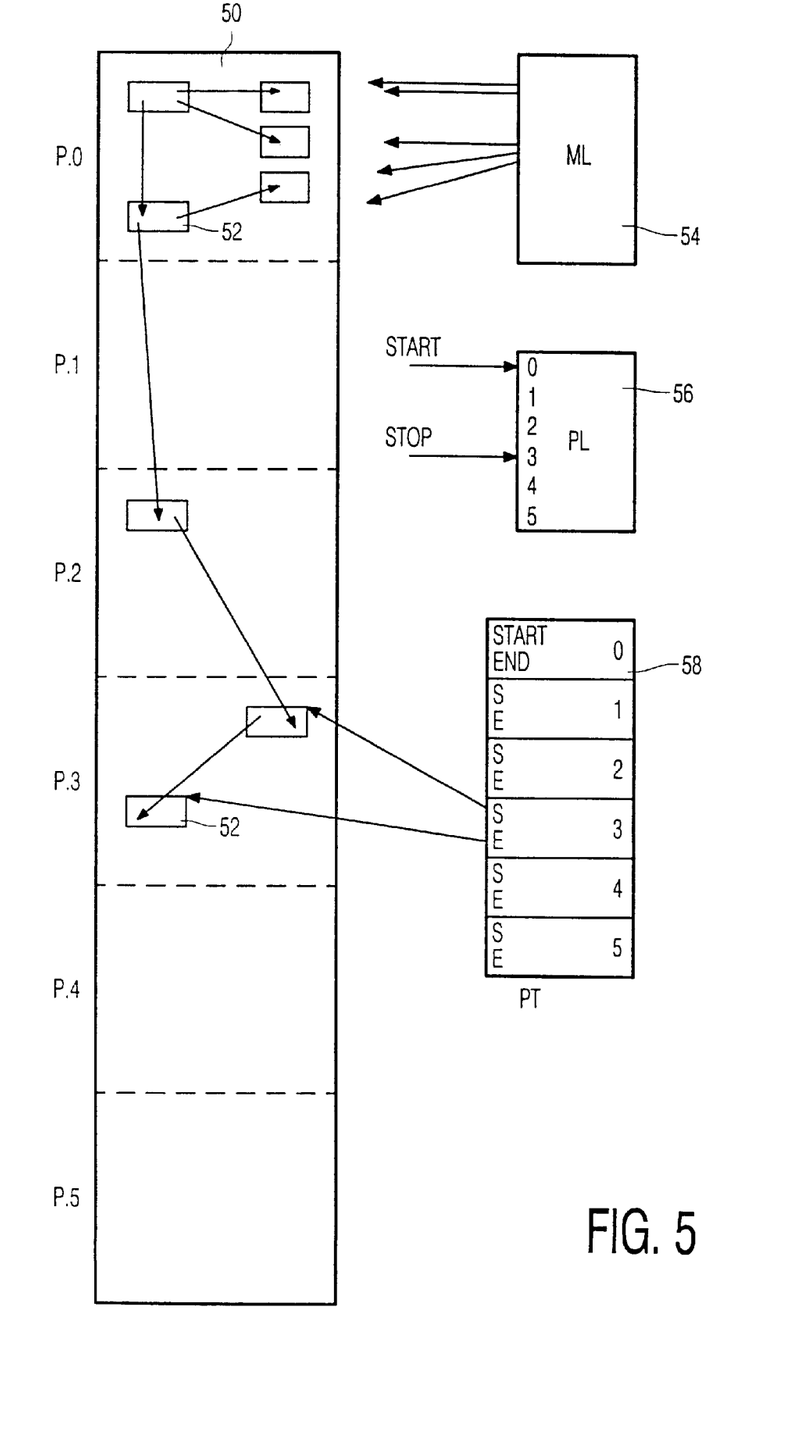
FIG. 5 represents a contiguous heap memory, containing a plurality of data objects, with additional reference stores employed during tracing.

FIG. 5 schematically represents a number of discrete memory areas from the system of FIG. 1, and in particular a heap memory 50 holding a large number of data objects 52 for use by various programme threads. The following examples are compliant with memory management techniques in the Java (® Sun Microsystems Inc) virtual machine and the terminology should be construed accordingly: it will be recognised however that the present invention is not restricted to Java-compliant systems, nor to purely virtual memory management. In the arrangement shown, it is the heap memory 50 for which garbage collection is performed such that data objects are removed following their last or only reference by a program.

The heap 50 is considered one contiguous area of memory. It is logically split into pages P.0 to P.5 of a fixed size, and the data objects 52 may span multiple pages; page boundaries have no significance outside of the marking procedure. In conjunction with the heap 50, a number of discrete stored data structures are used. Physically, these may comprise separate entities or may be discrete areas within the memory containing the heap, but outside of the area scanned for garbage collection purposes. The first of these structures is a fixed-size mark store in the form of a stack 54, large enough to hold the maximum number of objects 52 that may be fitted into one page. The mark stack is used to process objects in one page at a time. The second structure is a fixed-size page list 56, large enough to contain a reference to each page of the heap; this is in the form of a circular buffer containing a reference to each page. It will be readily understood by the skilled practitioner that the mark store and page list are each capable of implementation as either a stack (as the mark store in the Figure) or a queue (as the page list in the Figure).

The third stored data structure is a fixed-size table 58 with entries for all pages. Each entry includes two pointer fields, Start and End. These fields are set to indicate the starting locations of the first and last objects to be marked in this page. An object is 'in' the page when the head pointer points to an address within the page. Objects which overflow into other pages are not referenced by these pointers.

The tracing and marking procedure will now be described with reference to FIGS. 6, 7 and 8: the procedure assumes a tricolour marking scheme, as described above, which shows that it is suitable for incremental approaches. Other mark state mechanisms are not incompatible with this algorithm.

Figure 6:
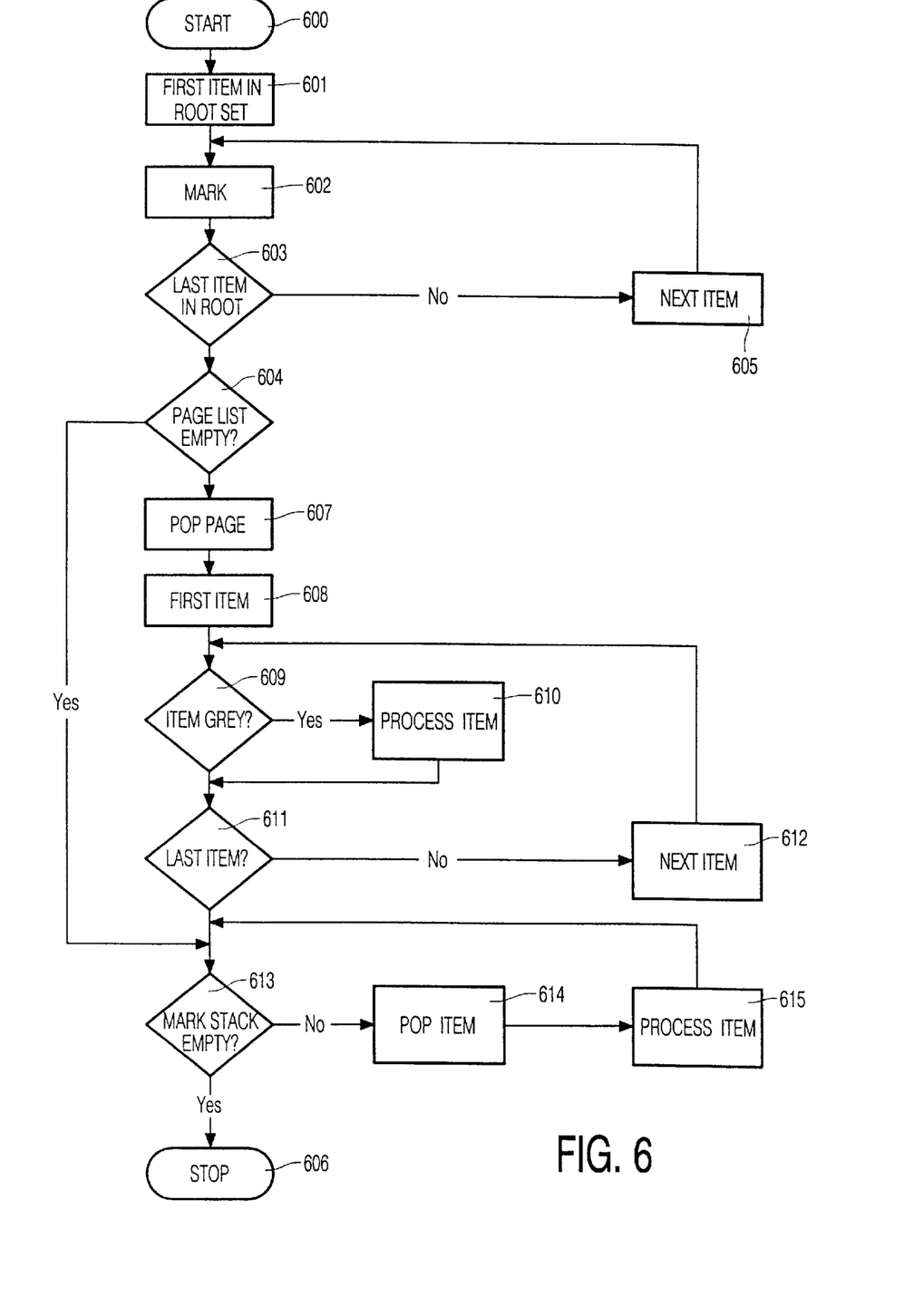
FIG. 6 is a flow chart describing a tracing/marking procedure embodying the present invention.

The main procedure is shown in FIG. 6; from a start at 600, the first procedure is to select the first item in a root set of objects, at 601. This root set comprises stacks, global objects, and generally any stored data entities that are capable of being referenced from outside the heap. Following selection, a mark sub-routine is executed at 602: the individual steps of this sub-routine will be described hereinafter with reference to FIG. 7. Following marking, a check is made at 603 as to whether there are any remaining items in the root set. If there are no remaining items in the root set to be processed, the procedure continues to 604, otherwise it reverts via 605 (selection of the next item from the root set) to the start of the item marking sub-routine 602. At 604, a further check is made as to whether the page list (56; FIG. 5) is empty and, if so, the procedure terminates at 606.

If the test of 604 shows the page list not to be empty, the next page is popped from the list at 607 and the first item within that page is selected at 608. At 609, a check is made as to whether the item is already marked grey (that is to say it has been reached but not yet fully considered by the heap traversal). If the item is grey, it is processed at 610: the detailed steps of processing will be described hereinafter with reference to FIG. 8. If the result of test 609 is negative (i.e the item is not grey) a further check is made at 611 as to whether the item is the last for the particular page: if not, the next item from the page is selected at 612 and the procedure reverts to the test as to whether that item is grey at 609. If the test of 611 shows that all items from the page have been considered, the next test (at 613) determines whether there are any remaining items in the mark stack (54; FIG. 5) and, if so, the first of these is popped at 614 and subsequently processed at 615 (again using the processing routine of FIG. 8) before reverting to 613. When the mark stack is empty, the procedure terminates 605.

Figure 7:
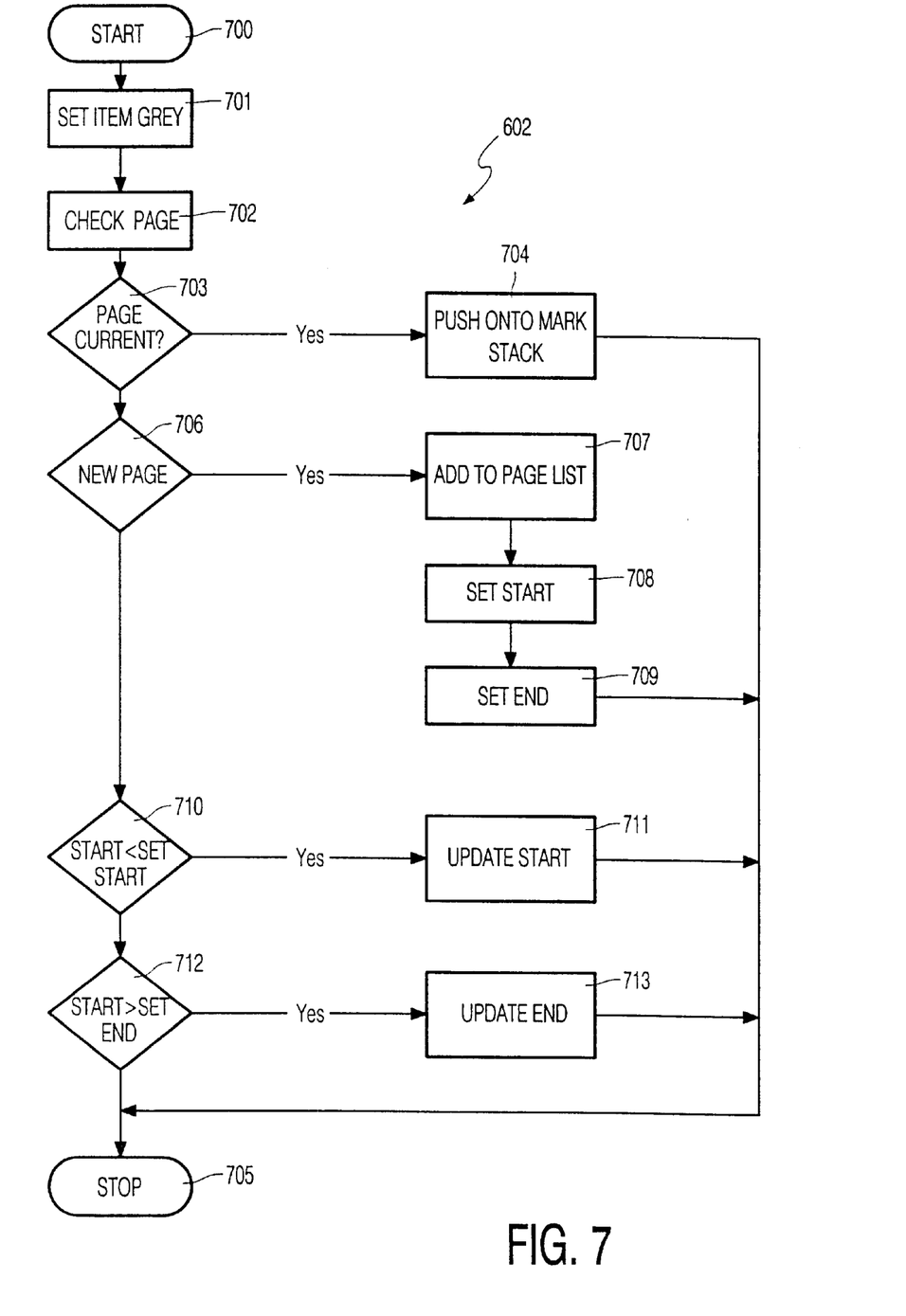
FIG. 7 is a flow chart describing the object marking step of FIG. 6 in greater detail.

The marking procedure of step 602 is shown in detail in FIG. 7 and commences at 701 with the setting of the item to grey. At 702, a determination is made as to which page of the heap memory the item under consideration lies in. If, as determined by step 703, the item lies in the current page under consideration, the item is pushed onto the mark stack at 704 for subsequent processing within the page, following which the mark process ends at 705.

If the test of 703 shows the item under consideration to lie outside of the current page, the page table for the page in which the item actually lies may require updating or even creating. At step 706, a check is made as to whether the start pointer for the newly identified page is set to null. If so, it is assumed that there are no existing objects logged for that page. Consequently, at step 707 the newly identified page is added to the page list (56, FIG. 5) to indicate that it contains "live" objects following which the start and end pointers for that page are each set to the start of the item under consideration, at steps 708 and 709 respectively, following which the procedure terminates at 705. If the page table start pointer does not have a null value (706) it means that there is already at least one object logged for that page. In such circumstances, it will generally be necessary to adjust either the start or end pointer to take account of the newly considered item. At step 710 a check is made as to whether the start of the new item is closer to the beginning of the page than the existing location specified by the start pointer: if so, at step 711 the start pointer is updated. At step 712 a check is made as to whether the start of the newly considered item is closer to the end of the page than the location specified by the page end pointer and, if so, the end pointer is updated at 713 and, again, the procedure terminates.

Figure 8:
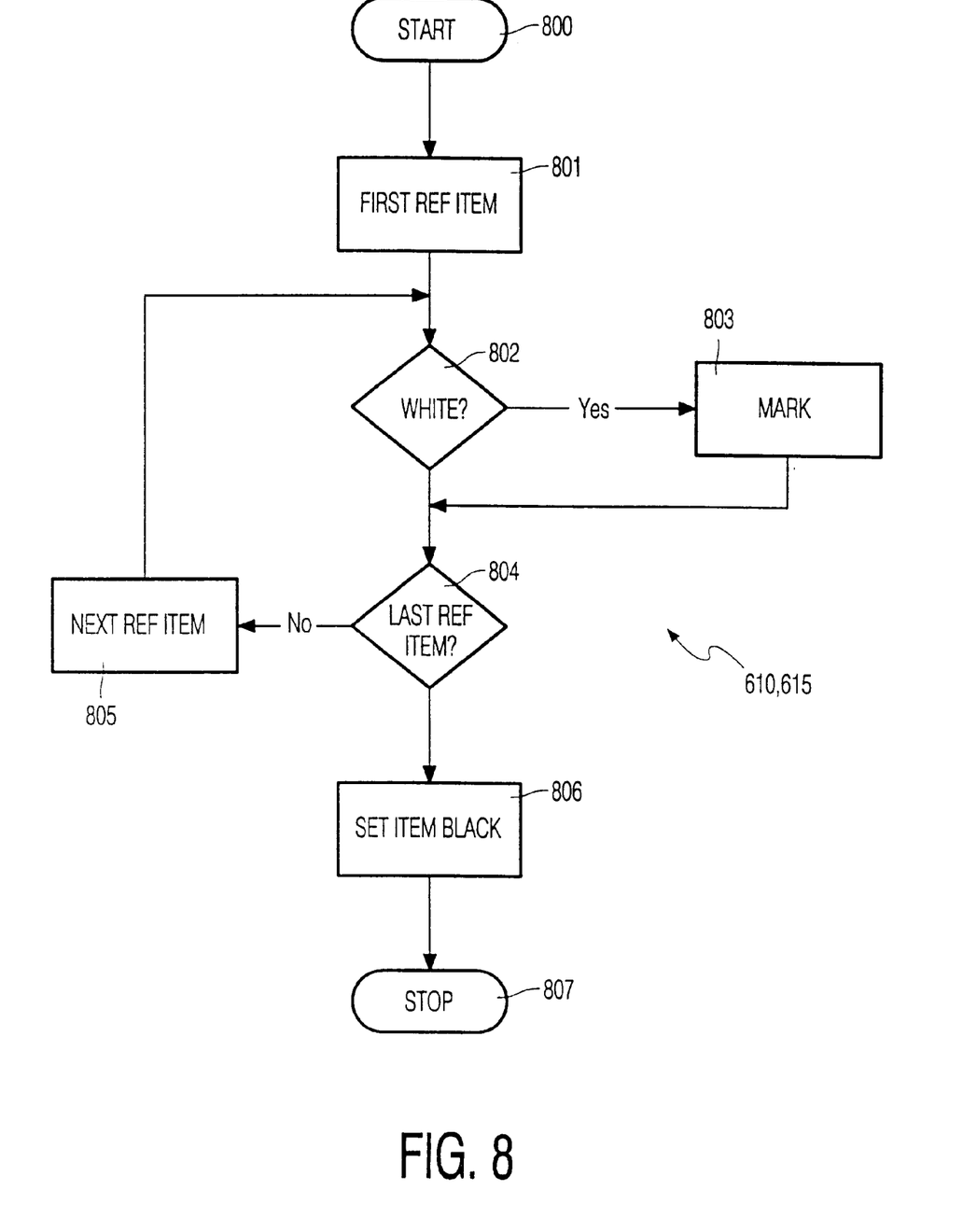
FIG. 8 is a flow chart describing the object processing step of FIG. 6 in greater detail.

The item processing stages at 610 and 615 in FIG. 6 are shown in greater detail in FIG. 8. From the start at 800, the first item for which the item under consideration carries a pointer is selected at 801. At 802 a check is made as to whether this first selected item is white (i.e previously unmarked) in which case at step 803 the item is marked. At step 804 a check is made as to whether there are any further items referenced by the item under consideration and, if so, the next of these items is selected at 805 and the procedure reverts to the test of whether or not this item is white, at step 802. When all items referenced by the item under consideration have been dealt with, as determined by step 804, the item under consideration is set to black at step 806 before the routine terminates at 807.

Once the procedure of FIG. 6 has completed, all objects are in the White or Black state. White objects are available for deletion.

This procedure may be implemented (in slightly modified form) without a local mark stack, with all mark operations instead adding data to the page table. However, given a reasonable level of locality of reference, the use of a mark stack is preferred as it will drastically reduce the number of times the page being processed will have to be replaced on the page list.

The performance of the algorithm will depend on a number of factors, a first of which is the page size. The rationale behind the page table is to narrow down the search space for objects. The worst-case situation is where the first and last items in the page are grey, but the intervening objects are not. The page size should be chosen so that this worstcase situation is acceptable. Small pages trade shorter scan phases against a higher static memory overhead for the page table.

A second factor is the locality of reference. Objects will often reference other objects that are close in memory to each other. How common this occurrence actually is depends on the allocation system employed, and other processes which may move data, such as a memory compaction process. The mark stack is used to store intra-page references to avoid unnecessary processing on the page table. As the size of each page is known, the number of items that can be processed on the mark stack for each page process phase is known. The higher the degree of locality of reference, the fewer the number of pages that will be placed on the page list, and the fewer the number of iterations of the outer loop. The page size should be chosen such that a large proportion of typical data structures will fit completely in one page and therefore inter-page pointers will tend to occur between logically separate data items.

Although defined principally in terms of a software browser implementation, the skilled reader will be well aware than many of the above-described functional features could equally well be implemented in hardware.

From reading the present disclosure, other modifications will be apparent to persons skilled in the art. Such modifications may involve other features which are already known in the design, manufacture and use of image processing and/or data network access apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A marking method for traversing data structures formed of data objects linked by identifying pointers in a contiguous memory, preparatory to garbage collection of unmarked data objects, the method comprising the steps of:
   a) for a selected root object, traversing the pointers carried thereby to determine the objects linked to the root object;
   b) entering references to each object newly determined by the preceding step to a fixed size marking structure; and
   c) traversing pointers to determine further objects linked to those identified by the previous step;
   wherein steps b) and c) are repeated until the marking structure is full, following which the objects identified therein are marked, then the memory is scanned to locate any further objects linked to those already marked, characterised in that the contiguous memory is divided into a plurality of discrete pages, steps b) and c) are restricted to those objects within the same page as the root object, and for any linked object of that page, an identifier for that page is instead stored at step b), and wherein the method further comprises generating, for each page, an indication of the extent of coverage of that page by located data objects, and the scanning of the memory to locate any further objects linked to those already marked is performed only for those covered areas within the page identified by the identifier.

2. A method as claimed in claim 1, wherein the marking structure is of a size to accommodate respective references for the largest number of objects capable of being contained in a page.

3. A method as claimed in claim 1, wherein steps a), b), and c) are performed for each page in sequence, and the iteration of steps b) and c) is repeated cycling through said pages until no unmarked linked objects remain within the contiguous memory.

4. A method as claimed in claim 3, coupled with the subsequent step of deleting any remaining unmarked objects.

5. A data processing apparatus comprising a data processor coupled with a random access memory containing a plurality of data objects linked in data structures by identifying pointers and within a contiguous area of the memory, the apparatus further comprising first additional storage means containing a fixed sized marking data structure, and the processor being configured to effect the following operations on the stored plurality of data objects:
   a) for a selected root object, traversing the pointers carried thereby to determine the objects linked to the root object;
   b) entering references to each object newly determined by the preceding step in the structure of the first additional storage means; and
   c) traversing pointers to determine further objects linked to those identified in the first additional storage means;
   wherein the processor repeats operations b) and c) until the marking structure is full, marks the objects identified therein, and scans the contiguous area of random access memory to locate any further objects linked to those already marked;
   characterized in that the contiguous memory is divided into a plurality of discrete pages, operations b) and c) are restricted to those objects within the same page as the root object, for any linked objects outside of that page, an identifier for that page is stored in a second additional storage means, and the scanning to locate any further objects linked to those already marked is performed only for those pages identified in the second additional storage means;
   a third additional storage means containing for each page, an indication of the extent of coverage of that page by located data objects, and the scanning to locate any further objects linked to those already marked is performed only for those covered areas within the respective pages identified in the second additional storage means.

6. Apparatus as claimed in claim 5, wherein the contents of each page are linearly addressed and the third additional storage means holds a pair of pointers to the start of respectively the first and the last located data objects.

7. Apparatus as claimed in claim 6, wherein the processor is configured, on identifying an object in a page other than that being processed, to compare the start location for the newly-located object with the respective start and end pointers for that page and update them as appropriate.

* * * * *